June 26, 1956  M. HEINEMANN ET AL  2,751,636
PLUG-TYPE DOORS FOR PRESSURIZED CABINS
Filed April 11, 1955  4 Sheets-Sheet 3

INVENTORS.
MILTON HEINEMANN
VARNELL L.R. JAMES
BY
Reynolds, Beach & Christensen
ATTORNEYS June 26, 1956 M. HEINEMANN ET AL 2,751,636
PLUG-TYPE DOORS FOR PRESSURIZED CABINS
Filed April 11, 1955 4 Sheets-Sheet 4
Fig. 5.
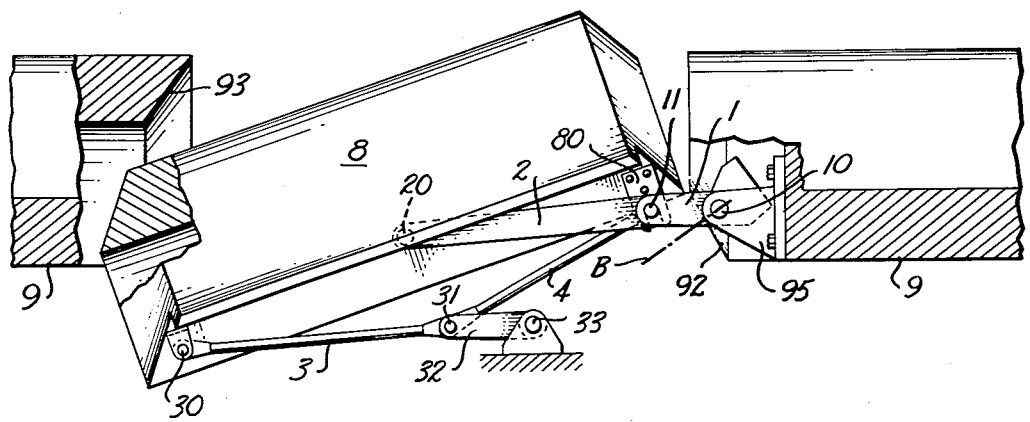
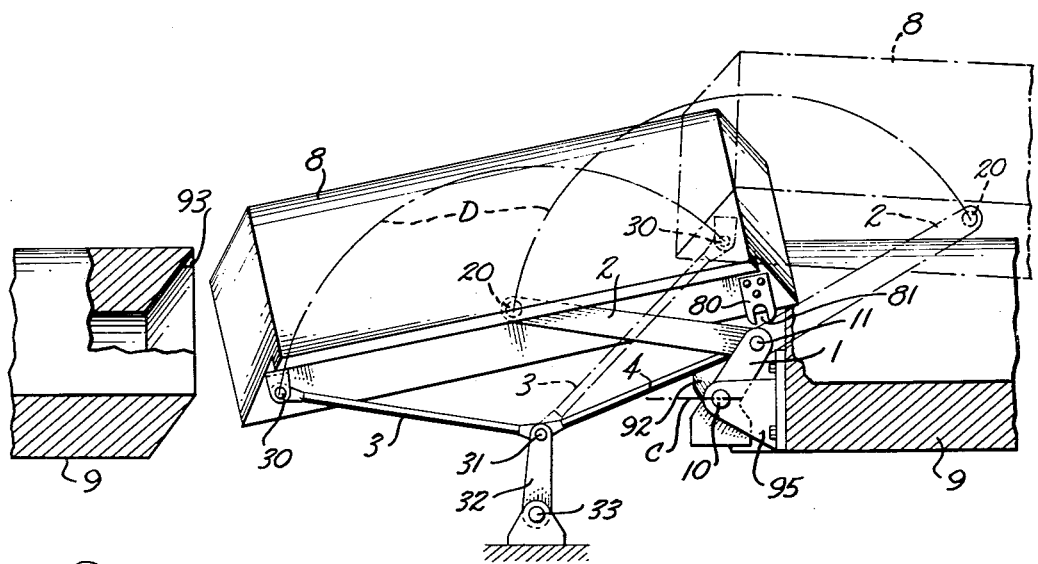
Fig. 6.
INVENTORS.
MILTON HEINEMANN
VARNELL L.R. JAMES
BY
Reynolds, Beach & Christensen
ATTORNEYS

United States Patent Office 2,751,636
Patented June 26, 1956

2,751,636

PLUG-TYPE DOORS FOR PRESSURIZED CABINS

Milton Heinemann and Varnell L. R. James, Seattle, Wash., assignors to Boeing Airplane Company, Seattle, Wash., a corporation of Delaware Application April 11, 1955, Serial No. 500,636

10 Claims. (Cl. 20—16)

Two problems arise in conjunction with aircraft cabin doors, especially when the cabin is pressurized, as are most cabins of present-day passenger-carrying airplanes. One such problem has to do with the curved formation of the aircraft and of the door, the necessity for maintaining that curved conformation with virtually no interruption to the smoothness of the external contour while the aircraft is in flight, yet enabling the opening outwardly of the door into a position preferably such that it fits snugly against the cabin's contour when the aircraft is at rest upon the ground. The second has to do with the securing of the door while in flight against bursting pressures arising from the elevated cabin pressures, and especially without the necessity of sole reliance on securement of the door by latches, locks and the like, which may fail to be secured properly, which might be accidentally released while in flight, or which may fail mechanically.

There have been proposals for solving the first problem, and an instance is found in the patent to Muller, No. 2,564,988. The Muller proposal, however, ignores the second problem, since the door seats inwardly from the exterior, and is held closed wholly by mechanical securing means. Should these fail, or become accidentally released during flight, an outdraft is created which, in some instances in the past, has swept an occupant of the cabin outwardly through the suddenly opened doorway, and he has fallen to his death.

There have been attempts also to solve the second problem, and an example thereof is found in the copending application of F. W. McAfee, R. B. Snively, and A. A. Vannest, Serial No. 436,276, filed June 14, 1954. The McAfee et al. proposal includes a doorway which is inwardly flanged along the greater part of the sill and lintel, and one vertical side, leaving the fourth side and a portion of the sill and lintel adjacent the same unflanged, so that the door, which seats from the interior against the flanges and is held there by the superior cabin pressure, can, when the airplane is ground-borne, be moved edgewise through the unflanged portion of the doorway to the exterior, and so be folded back against the cabin structure at one side of the doorway. This proposal, however, is subject to the objection that the flanged portion of the sill, in particular, stands up above the general level of the sill, and unless means are taken to guard against the possibility, a passenger entering or leaving through the doorway may stumble on this projecting flange. The McAfee et al. proposal incorporates means to mask this upstanding sill flange, but by so much adds to the weight, to the cost, and to the complexity of the structure.

According to the present invention, a door is employed which is sufficiently larger than the doorway in lateral extent that it may seat from the interior outwardly against the two spaced jambs of the doorway. The door, however, is of a vertical extent just sufficiently less than the spacing between the sill and the lintel of the doorway that the door may move edgewise through the doorway. Before it can so move, it must be displaced laterally and tilted on an upright axis so that it disengages the jambs and projects one of its side edges outwardly. Thereafter it may be moved outwardly through the doorway, and finally laterally into a position exteriorly of the cabin structure and alongside the doorway. When closed, because of the greater lateral extent of the door than of the doorway, the superior interior cabin pressure will act over the entire surface area of the door to hold the door seated against the more narrowly spaced jambs, provision being made for sealing the upper and lower edges (indeed, for sealing all four edges) of the door. By this construction the sill is free of any upstanding obstruction, the door is held seated by the cabin pressure, and cannot possibly be opened while in flight, yet when the aircraft is ground-borne and the internal and external pressures are equalized the door may readily be opened and moved into an out-of-the-way exterior position, where its curved contour corresponds generally to the similar contour of the adjacent aircraft cabin structure.

These ends are accomplished by supporting and guiding the door by means of what may be termed an articulated double quadrangular linkage mechanism, in which one quadrangle has the function of displacing the door from its closed, seated position, slightly laterally and at the same time tilting one of its edges inwardly and projecting the other edge outwardly through the doorway, after which the second quadrangle comes into operation to function in the manner of approximately parallel linkage, to displace the door laterally while the first-mentioned quadrangle continues to project the door outwardly, or after such projection is completed. At the end of the movement the door is in its open position, alongside of the doorway and exteriorly of the cabin structure. The linkage is so arranged as to move the door through definite positions, so that it may not move uncontrollably under the influence of a propeller slip stream or other aerodynamic forces which may be acting upon the airplane, with the attendant possibility of damage to the door or to the cabin structure.

The objects of the present invention are understandable from the above, and the mechanism by which those objects are attained will be made clear in the following specification, aided by the accompanying drawings, both of which disclose the invention in a typical embodiment, and the novel features of the invention will be made clear by the appended claims.

Figures 3, 4, 5 and 6 are sequential views, as though in plan, looking downwardly at the top of the door, and with various parts broken away to show the relationship of parts in the different successive positions during opening, from the closed position of Figure 3 to the open position shown in Figure 6 in dot-dash lines.

Figure 1:
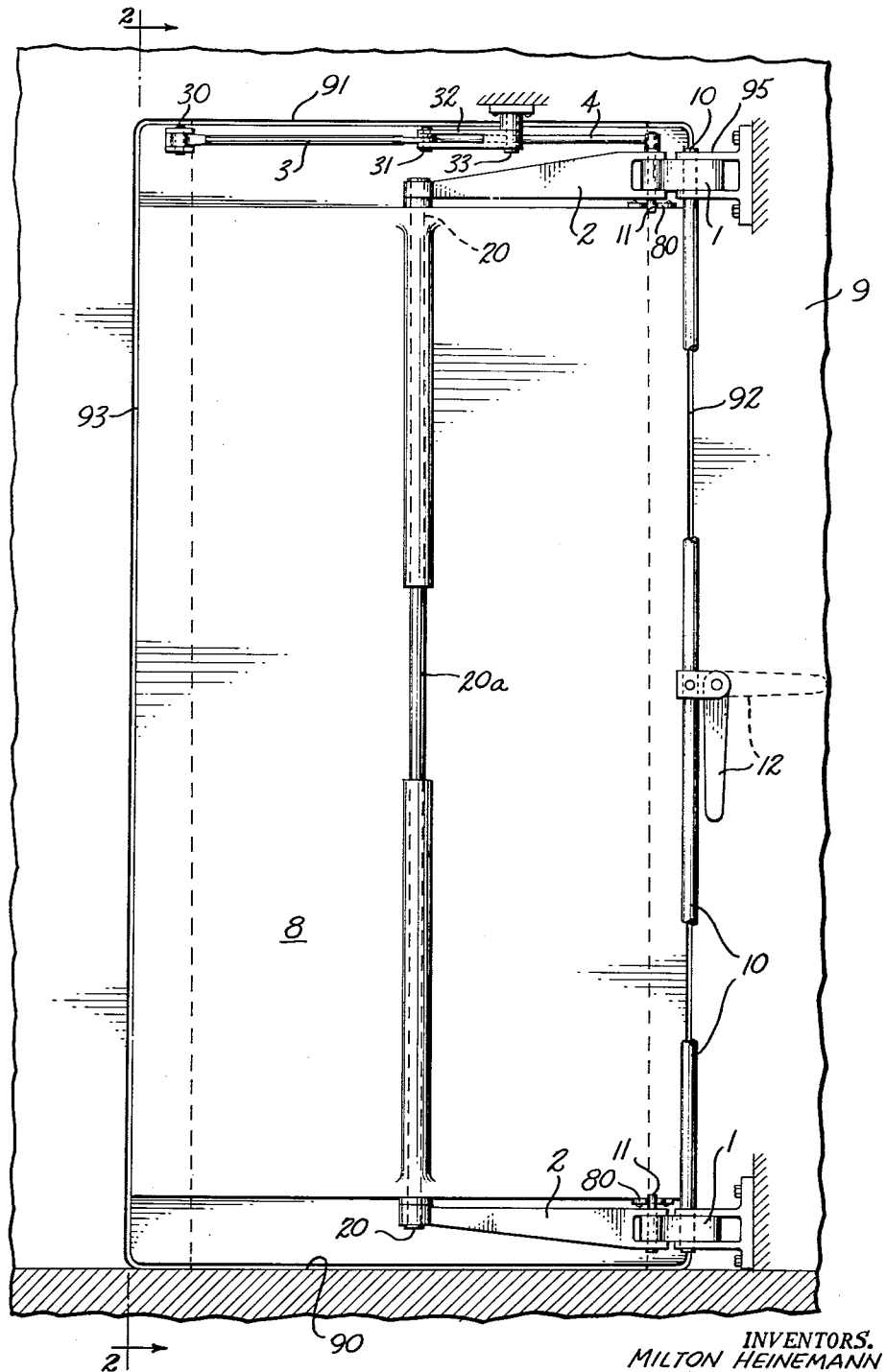
Figure 1 is an interior elevational view of the door in its closed position, with parts of the operating mechanism broken away, and with certain of the surrounding structure shown diagrammatically and in section.

Details of the aircraft cabin structure are immaterial, and no attempt has been made to show them herein, except as the structure, designated generally by the numeral 9, has a doorway to the exterior defined by the sill 90, the lintel 91, and two spaced side jambs, designated, to distinguish them, by the numerals 92 and 93. These two jambs are shown as beveled, with their respective bevels converging outwardly, so that the doorway, thus defined, is laterally of less width at the outer surface of the cabin than at the inner surface thereof. The sill and lintel, however, are uninterrupted and parallel.

A door 8, of a height just sufficiently less than the spacing between the sill 90 and the lintel 91 to pass therebetween, is of a width and shape complemental to the jambs 92 and 93, whereby, when the door is seated from the interior outwardly against the jambs, any cabin pressure superior to ambient pressure, acting over the entire interior surface of the door, will urge the door outwardly and hold it seated against the jambs. Suitable sealing provisions would be employed at the jambs, and at the sill and lintel as well, but these have been omitted for simplicity of illustration.

Figure 2:
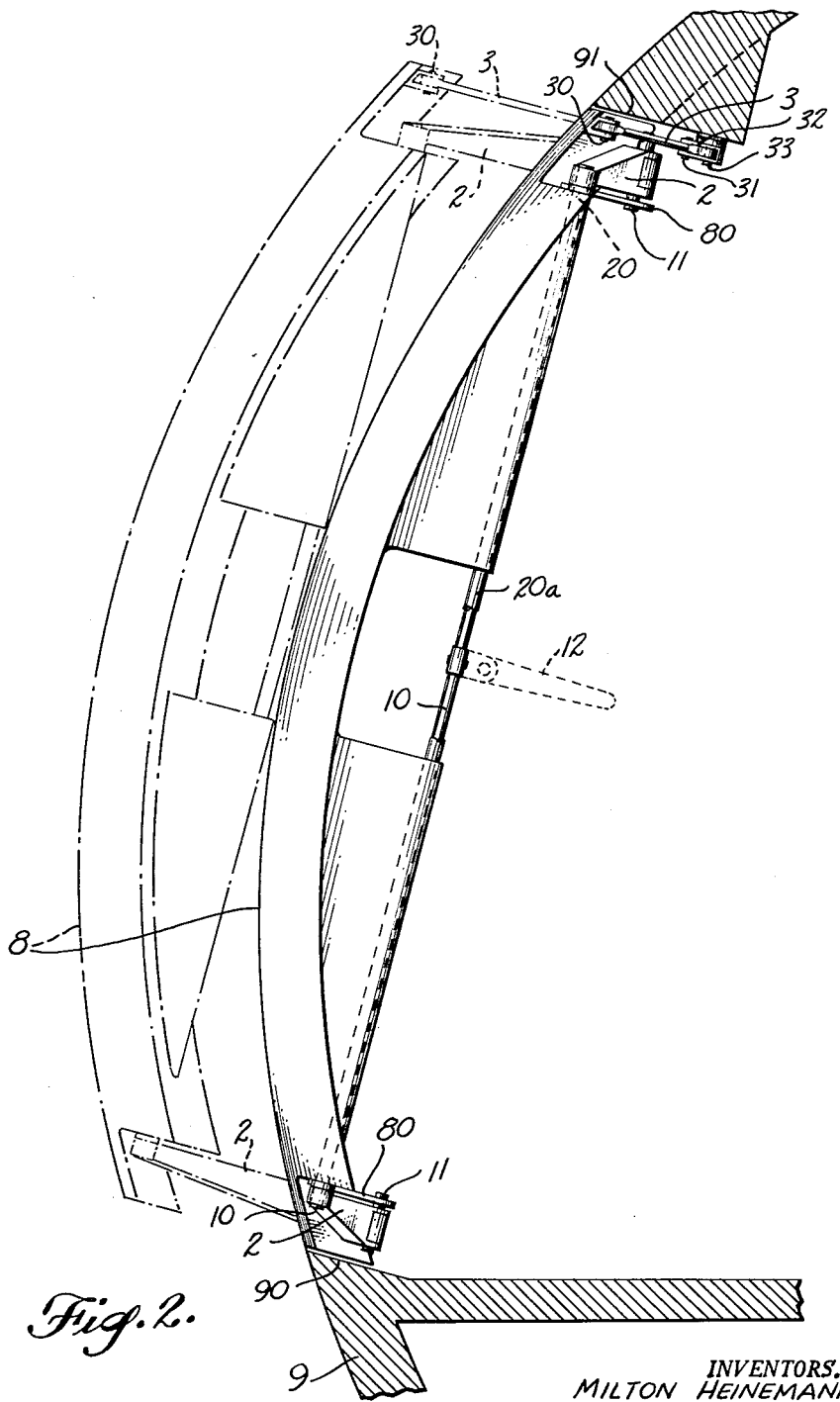
Figure 2 is a vertical sectional view through the doorway, showing the door in its closed position in edge elevation, the viewpoint being indicated by the line 2—2 of Figure 1, and showing the door in dot-dash lines in its open position.
Figure 3:
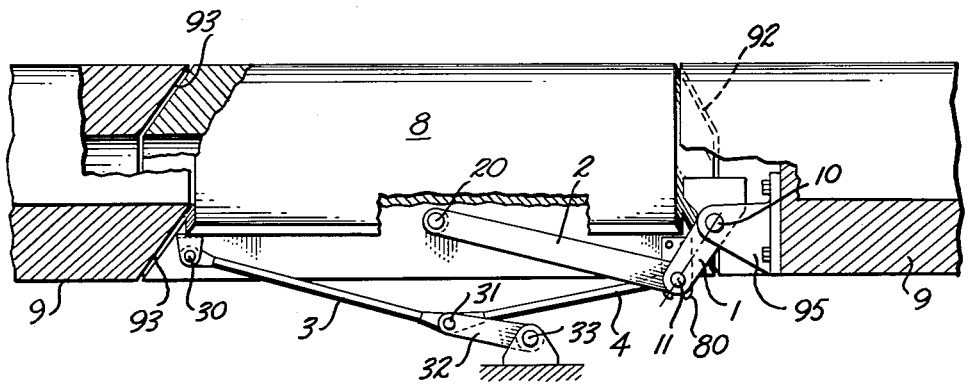

The closed position of the door is shown in Figure 1, and in full lines in Figure 2, and is shown also in Figure 3. Figure 6 shows the fully open position of the door in dot-dash lines, and the dot-dash line showing in Figure 2 also illustrates the door in its fully open position. In such open position it is wholly exterior of the aircraft cabin, and alongside the doorway. Preferably its curvature, which matches the curvature of the cabin structure, is placed in general parallelism with the cabin structure at the side of the doorway. Obviously the door cannot be moved directly outwardly from the closed position of Figure 3 to the fully open position shown in dot-dash lines in Figure 6. According to the present invention, its movement between such two terminal positions is accomplished by door-supporting and -guiding mechanism, such as will now be described in detail.

The door is supported at top and bottom primarily by a pair of short lever arms 1. These short lever arms are pivotally mounted at one end upon a rotative upright shaft 10, supported in brackets 95 which are in effect part of the aircraft cabin structure, whereby the arms 1 may swing from an inwardly inclined position, shown in Figure 3, wherein the door is fully closed, to an outwardly and oppositely inclined position, shown in Figure 6. The swinging end of each lever 1 carries a pivot pin 11, by which the swinging end of each arm 1 is pivotally interconnected with one end of a long lever arm 2. The opposite end of this long lever arm 2 is pivotally connected to the door 8 at a pivot point 20 which is located intermediate the side edges of the door, and preferably approximately midway therebetween. In addition, each pivot pin 11 is received, when the door is seated, within the inwardly opening slot 81 of a bracket 80, which is fixed upon the door adjacent its one edge, that edge which is first to be projected outwardly through the doorway in opening. So long as the pivot pin 11 remains engaged with its bracket 80, the long lever arm 2 is motionless and ineffective with respect to the door, and hence in effect the door is supported solely by the short lever arms 1.

Since the short lever arms 1 in the closed position of the door, illustrated in Figure 3, are inclined inwardly, it is evident that initiation of clockwise rotation of the short lever arm 1, engaged at its swinging end with the bracket 80, will displace the door 8 bodily to the left, provided the door's second or left edge is pulled inwardly to clear the jamb 93. Mechanism to effect such tilting movement of the door will now be described.

A long link 3, of which there need be only one, located adjacent the head of the door, is pivotally connected at one end at 30 to the door 8, adjacent its second edge, and the other end of the link 3 is pivotally supported at 31, although indirectly, from the cabin structure. The preferred connection is by means of a short link 32, pivotally interconnected at 31 to the longer link 3, and pivotally connected at 33 to the cabin structure. A tie rod or link 4 interconnecting the pivot at 31 with the pivot pin 11 completes the door-guiding mechanism.

The length of the link 4 is approximately the distance between the pivots 20 and 30 upon the door. The length of the long link 3 is approximately the same as the length of the long lever arm 2. These elements, then, with the portion of the door intervening between the links 20 and 30, constitute an articulated approximate parallel linkage. The short link 32 approximates the same length as the short lever arm 1, and since the pivot 10 and the pivot 33 are relatively fixed, both being at fixed points upon the cabin structure, and since the tie link 4 interconnects the pivots 11 and 31, these short arms constitute in effect a part of an articulated quadrangular linkage, but with parts so arranged that the lever arm 1 and the link 32 are seldom, in fact in only one position during their movement, in parallelism.

Figure 4:
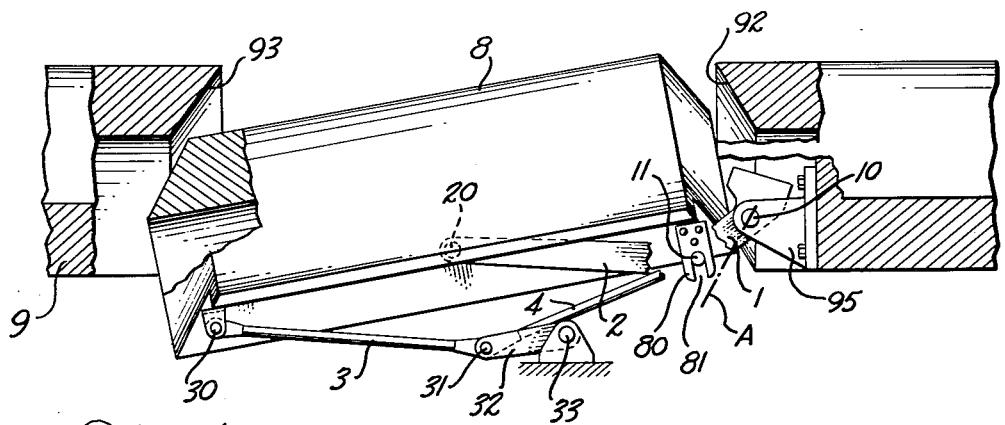

Clockwise rotation of the pivot shaft 10 may be effected by means of a hand lever 12, by the action of a member of the plane's crew. Starting with parts in the closed position of Figure 3, such rotation will act upon the door at the now fixed connection of the pivot pin at 11, to urge the door to the left, as well as moving its first edge outwardly. This motion of the pivot pin 11 is communicated through the tie link 4 to the short link 32 and to the long link 3, and they will move into the position shown in Figure 4, pulling the second edge of the door inwardly, in order to permit the leftward movement of the door. In Figure 4 the connected ends of the lever arms 1 and 2 have been broken away, but the pivot pin 11 is shown in its still-connected relation to the bracket 8 and its slot 81. The short lever arm 1 has moved from the dot-dash line position A of Figure 4, which represents its position in Figure 3, to the position shown in full lines in Figure 4.

Coming to Figure 5, and continuing the clockwise rotation of the short lever arm 1, the first edge of the door, that adjacent the jamb 92, is now moving more rapidly outwardly through the doorway. The short lever arm 1 has moved from the dot-dash line position B of Figure 5, which corresponds to its position in Figure 4, to the position shown in full lines in Figure 5. The door-guiding mechanism, including the links 3 and 32, has further tilted the door's second edge, that adjacent the jamb 93, further inwardly. The pivot pin 11 is still engaged within the slot 81 of the bracket 80.

Continuing clockwise rotation of the short lever arm 1 from its position C, corresponding to the full-line position of Figure 5, eventually brings parts to the full-line position of Figure 6. By reason of the restraint on the pivot pin 11 afforded by the tie link 4 and the continued outward urging of the long link 3, the bracket 80 has withdrawn from engagement with the pivot pin 11, the short lever arm 1 has reached a terminal position, and yet for the time being the door is held in a fixed position by the interconnected links and levers, that is, it may not tilt about any single pivot axis. The pivots at 11 and at 31 being now fixed, it is clear that the long lever arm 2 and the long link 3 may function thereafter as an approximate parallelogram, so that if the door is grasped by the handle 20a it may be pushed outwardly, rotating, in the manner shown in the dot-dash line arcs D of Figure 6, into the final open position, shown in that view in dot-dash lines.

In closing the door the above operations proceed in reverse. The door is swung about the pivots 11 and 31 until the bracket 80 reengages its notch 81 with the pivot pin 11, after which the shaft 10 is rotated counterclockwise, and the door proceeds through the several positions illustrated in reverse order, until it finally reaches the fully closed position of Figure 3.

We claim as our invention:

1. In combination with the structure of a pressurized aircraft cabin which has a doorway to the exterior defined by a sill, a lintel, and two spaced jambs, a door of a height just sufficiently less than the spacing between the sill and lintel to pass therebetween, and of a width exceeding the spacing between the jambs, whereby to be held seated from the interior upon said jambs by the cabin pressure, means pivotally connected to the door intermediate its sides, and pivotally connected to one side of the doorway, said means supporting and guiding the door for translational movement laterally of the doorway and for swinging movement about said pivotal connections, and motion-controlling means interconnecting the door and the cabin structure, and coordinated with said supporting guiding means to tilt the door about its pivotal connection to said means, and to displace the door laterally relative to the doorway, upon initiation of opening movement of the door, until one upright edge of the door swings outwardly through the doorway, and its other upright edge swings inwardly, said supporting and guiding means and said motion-controlling means being further coordinated to displace the so outwardly swung edge of the door beyond its jamb, to leave the door in its open position outside of the cabin structure and at one side of the doorway.

2. In combination with the structure of a pressurized aircraft cabin which is formed with a doorway to the exterior defined by a sill, a lintel, and two spaced jambs, a door of a height just sufficiently less than the spacing between the sill and the lintel to pass therebetween, and of a width exceeding the spacing between the jambs, whereby to be held seated upon said jambs by the cabin pressure acting outwardly upon the interior surface of the door, means defining a first pivot axis upon the door located intermediate its upright side edges, elongatable and contractible means pivotally supported upon the cabin structure at one side of the doorway, and connected to the door at said pivot axis, for the support of said door, means defining a second pivot axis upon the door, offset from said pivot axis, and means operatively interconnecting the cabin structure and said second pivot axis, for controlling movement of the door as it swings with said door-supporting means, to tilt a first edge of the door outwardly about its first pivot axis and through the doorway as its opposite edge tilts inwardly, and simultaneously to displace the door laterally towards such opposite edge, by elongation of said door-supporting means, in initiating opening movement of the door, said door-supporting and movement-controlling means thereafter cooperating to guide the door outwardly through and reversely laterally of the doorway, and through successive definite positions into fully open position, wherein the door is located outside of the cabin structure and alongside the doorway.

3. In combination with the structure of a pressurized aircraft cabin which is formed with a doorway to the exterior defined by a sill, a lintel, and two spaced jambs, a door of a height just sufficiently less than the spacing between the sill and the lintel to pass therebetween, and of a width exceeding the spacing between the jambs so as to be held seated upon said jambs by the cabin pressure acting outwardly upon the interior surface of the door, means defining a first upright pivot axis upon the door located approximately midway between its side edges, means defining a second pivot axis upon the door adjacent a first side edge, a pair of vertically spaced short lever arms pivotally mounted coaxially upon the cabin structure adjacent such first side edge of the door, and disconnectibly pivotally connected at their swinging ends to said door-mounted means at the second pivot axis, and inclined inwardly of the cabin when the door is seated upon the jambs, a long door-supporting arm pivotally connected at one end to said short lever arm at a point which is held by the latter coaxial with the door's second pivot axis so long as said short lever arm is connected to that second pivot axis, said long arm being connected at its other end to said first pivot axis, means defining a third pivot axis upon the door, adjacent its second edge, being the edge which is opposite the location of the second pivot axis, and means operatively connecting the cabin structure and the third pivot axis, for controlling movement of the door, in cooperation with said short and long arms, to shift the door laterally as the short arm swings outwardly from its door-seated position, and simultaneously to tilt the first edge of the door outwardly through the doorway and its second edge inwardly, and thereafter, upon disconnection of the short arm from the second pivot means and continued outward swinging of said short arm, to guide the door through successive definite positions to a final position without the cabin structure and alongside the first edge of the doorway.

4. The combination of claim 3, wherein the door-controlling means includes a link pivotally connected to the door at the third pivot axis, and pivotally supported from the cabin structure in approximate parallelism with the long door-supporting arm.

5. The combination of claim 3, wherein the door-controlling means includes a first long link pivotally connected to the door at the third pivot axis, of a length approximating the length of the long door-supporting arm, a short link of a length approximating the length of the short lever arm, pivotally mounted at one end upon the cabin structure intermediate the jambs, and pivotally supporting the long link's other end, and a second long link joining the pivotal joint between the two lever arms with the pivotal joint between the first long link and the short link.

6. In combination with the structure of a pressurized aircraft cabin which is formed with a doorway to the exterior defined by a sill, a lintel, and two spaced jambs, a door of a height just sufficiently less than the spacing between the sill and the lintel to pass therebetween, and of a width exceeding the spacing between the jambs so as to be held seated upon said jambs by the cabin pressure acting outwardly upon the interior surface of the door, an inwardly opening slotted bracket mounted upon the door adjacent a first jamb, a long and a short lever arm and a pivot pin pivotally interconnecting said arms, said pivot pin being received in the bracket's slot while the door is held seated, the other end of the long arm being pivotally connected to the door, intermediate its side edges, and the short arm being pivotally supported upon the cabin structure adjacent the first jamb, and inclined inwardly while the door is held seated, and door-controlling means including a long link pivotally connected at one end to the door adjacent the second jamb, and pivotally supported at its other end from the cabin structure, and means to maintain the long link in general parallelism with the long lever arm, prior to and after disconnection of the bracket from its engaged pivot pin, and during outward swinging of the short lever arm to project the door edgewise outside the doorway, and then laterally to an open position alongside the doorway.

7. The combination of claim 6, wherein the door-controlling means, and in particular its means to maintain parallelism, includes a second long link pivotally joined at one end to the first long link at the latter's end distant from the door, and pivotally joined at its other end to the pivot pin which interconnects the long and short arms, and means supporting the common pivot connection between the two long links for displacement thereof, as the door moves towards its open position, outwardly and then towards the first jamb.

8. The combination of claim 7, wherein the means supporting the common pivot of the two long links comprises a short link pivotally joined at one end to that common pivot, and pivotally supported at its other end upon the cabin structure, said short link being of a length approximating the length of the short lever arm.

9. In combination with the structure of a pressurized aircraft cabin which is formed with a doorway to the exterior defined by a sill, a lintel, and two spaced jambs, a door of a height just sufficiently less than the spacing between the sill and the lintel to pass therebetween, and of a width exceeding the spacing between the jambs so as to be held seated upon said jambs by the cabin pressure acting outwardly upon the interior surface of the door, supporting and guiding mechanism for the door comprising a long and a short arm pivotally interconnected and a long and a short link pivotally interconnected, and laterally displaced relative to the long and short arms, said arms and links being pivotally mounted, the shorter elements upon the cabin structure and the longer elements upon the door, a tie link joining the common pivot of the arms and the common pivot of the links, to define a double quadrangle wherein the longer elements are generally parallel in all their positions, and the shorter elements are in most positions non-parallel, and are arranged to cooperatively effect lateral displacement and tilting of the door at one edge outwardly through the doorway in the initial stage of its opening movement, and means releasably interengageable between the door, at one edge, and one such common pivot, releasable following such initial opening movement of the door to free the longer elements for conjoint pivotal movement relative to the shorter elements, to displace the door laterally to one side of the doorway as continued movement of the shorter elements completes its projection outwardly of the doorway.

10. In combination with the structure of a pressurized aircraft cabin which is formed with a doorway to the exterior defined by a sill, a lintel, and two spaced jambs, a door of a height approximating the spacing between the sill and lintel but sufficiently less that it may pass therebetween, and of a width exceeding the spacing between jambs so as to be held seated upon said jambs by the cabin pressure acting outwardly upon the interior surface of the door, and guiding and supporting means interconnecting the door and the aircraft structure adjacent the doorway, organized and arranged to displace the door, in opening outwardly from its closed position, initially inwardly at a first edge and bodily laterally with said first edge leading, and outwardly at the second edge, and subsequently edgewise outwardly through the doorway with said second edge leading, to an opened position substantially clear of the doorway and outwardly of the aircraft structure.

References Cited in the file of this patent

UNITED STATES PATENTS

| | | |
|---|---|---|
| 2,161,323 | Stephenson | June 6, 1939 |
| 2,564,988 | Muller | Aug. 21, 1951 |